United States Patent
Dasgupta et al.

(10) Patent No.: US 9,928,472 B2
(45) Date of Patent: *Mar. 27, 2018

(54) SYSTEM AND METHOD FOR DETERMINING OPTIMAL ASSET CONFIGURATIONS WHILE MINIMIZING DISRUPTION TO EXISTING BUSINESS OPERATIONS IN A SERVICE DELIVERY ENVIRONMENT

(71) Applicant: International Business Machines Corporation, Armonk, NY (US)

(72) Inventors: Gargi Dasgupta, Gurgaon (IN); Nirmit V. Desai, Bangalore (IN); Yixin Diao, White Plains, NY (US); Aliza R. Heching, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 304 days.

This patent is subject to a terminal disclaimer.

(21) Appl. No.: 13/712,142

(22) Filed: Dec. 12, 2012

(65) Prior Publication Data

US 2014/0163942 A1    Jun. 12, 2014

(51) Int. Cl.
*G06Q 10/06* (2012.01)

(52) U.S. Cl.
CPC .............. *G06Q 10/06313* (2013.01)

(58) Field of Classification Search
CPC ............................... G06Q 10/06315
USPC ........................................ 705/7.25
See application file for complete search history.

(56) References Cited

U.S. PATENT DOCUMENTS

| 7,483,842 B1 | 1/2009 | Ring et al. |
| 8,321,859 B2 | 11/2012 | Shapiro |
| 8,417,715 B1 * | 4/2013 | Bruckhaus et al. .......... 707/758 |
| 2003/0046212 A1 | 3/2003 | Hunter et al. |

(Continued)

OTHER PUBLICATIONS

Sönke Hartmann et al, A survey of variants and extensions of the resource-constrained project scheduling problem, European Journal of Operational Research 207 (2010) 1-14.*

(Continued)

*Primary Examiner* — Andre Boyce
(74) *Attorney, Agent, or Firm* — Louis J. Percello; Ryan, Mason & Lewis, LLP (57) ABSTRACT

A system for determining asset configuration in a service delivery environment, comprises a simulation module developing a simulation model reflecting features of the service delivery environment, a search module using the simulation model and constraint data to determine a plurality of asset configurations for evaluation, a first evaluation module determining a value of each of the asset configurations, and determining the asset configuration of the plurality of asset configurations that yields a value meeting a predetermined objective, and a second evaluation module determining a deviation from a current configuration that would be caused by each of the asset configurations, and determining the asset configuration that yields a lowest deviation of the plurality of asset configurations, wherein the second evaluation module uses the value meeting the predetermined objective from the first evaluation module as a constraint when determining the asset configuration that yields the lowest deviation.

10 Claims, 5 Drawing Sheets

(56) References Cited

U.S. PATENT DOCUMENTS

| | | |
|---|---|---|
| 2003/0061004 A1 | 3/2003 | Discenzo |
| 2004/0267395 A1 | 12/2004 | Discenzo et al. |
| 2005/0187844 A1 | 8/2005 | Chalermkraivuth et al. |
| 2006/0247990 A1 | 11/2006 | Narayanan et al. |
| 2007/0005414 A1 | 1/2007 | Connors et al. |
| 2008/0010044 A1 | 1/2008 | Ruetsch |
| 2008/0183542 A1 | 7/2008 | Connors et al. |
| 2009/0099898 A1 | 4/2009 | Ehrman et al. |
| 2011/0131075 A1 | 6/2011 | Robertson et al. |
| 2012/0253879 A1* | 10/2012 | Santos et al. ............... 705/7.22 |
| 2013/0013359 A1* | 1/2013 | Kohler et al. ............... 705/7.13 |

OTHER PUBLICATIONS

PCT International Search Report and Written Opinion, dated Apr. 15, 2014, for counterpart PCT Application PCT/US2013/61961.
Sönke Hartmann et al.,"A Survey of Variants and Extensions of the Resource-Constrained Project Scheduling Problem," European Journal of Operational Research, 207, 2010, pp. 1-14.

* cited by examiner

SYSTEM AND METHOD FOR DETERMINING OPTIMAL ASSET CONFIGURATIONS WHILE MINIMIZING DISRUPTION TO EXISTING BUSINESS OPERATIONS IN A SERVICE DELIVERY ENVIRONMENT

TECHNICAL FIELD

The field generally relates to systems and methods for determining optimal asset configurations and, in particular, to systems and methods for determining optimal asset configurations while minimizing disruption to existing business operations in a service delivery environment.

BACKGROUND

Service delivery can refer to proactive services that are delivered to provide adequate support to business users. Services may be provided from a variety of sources, including but not limited to, Internet and network service providers, and may include general business services, such as, for example, accounting, payroll, data management, and computer type services, such as, for example, information technology (IT) and cloud services. A service delivery environment includes, for example, a team of agents with one or multiple skills relating the delivered services, wherein the agents provide services to support the customers that require one or multiple levels of skills. In a service delivery environment, there may exist one or more defined shift schedules to which the agents are assigned.

Service agents and the service delivery group or organization to which they belong typically strive to meet defined service-level targets, including, for example, response time, or the time taken to diagnose and solve a problem. In addition, service agents and service delivery organizations attempt to find a service solution which meets an objective, such as, for example, minimum cost or maximum profit, which can include minimizing asset costs and attempting to reduce or eliminate missed targets.

While there may be more than one solution to achieve the same objective, none of the known solutions or methods for meeting the objective takes into consideration minimizing unnecessary disruption to business operations.

SUMMARY

In general, exemplary embodiments of the invention include systems and methods for determining optimal asset configurations and, in particular, to systems and methods for determining optimal asset configurations while minimizing disruption to existing business operations in a service delivery environment.

According to an exemplary embodiment of the present invention, a system for determining asset configuration in a service delivery environment, comprises a simulation module capable of developing a simulation model reflecting features of the service delivery environment, a constraint module capable of receiving a plurality of constraints and outputting constraint data, a search module capable of using the simulation model and the constraint data to determine a plurality of asset configurations for evaluation, a first evaluation module capable of determining a value of each of the asset configurations, and determining the asset configuration of the plurality of asset configurations that yields a value meeting a predetermined objective, and a second evaluation module capable of determining a deviation from a current configuration that would be caused by each of the asset configurations, and determining the asset configuration that yields a lowest deviation of the plurality of asset configurations, wherein the second evaluation module uses the value meeting the predetermined objective from the first evaluation module as a constraint when determining the asset configuration that yields the lowest deviation, and wherein one or more of the modules are implemented on a computer system comprising a memory and at least one processor coupled to the memory.

The search module may use at least one of scatter search and tabu search to determine the plurality of asset configurations.

The first and second evaluation modules may be capable of determining whether the plurality of asset configurations meet the plurality of constraints.

Determining of the value of each of the asset configurations may be based on a number of agents in a configuration and use weighted amounts based on at least one of experience level and efficiency of the agents. Determining of the value of each of the asset configurations may be further based on utilization data.

The first evaluation module may cease determining the value of each of the asset configurations if at least one of a pre-determined number of asset configurations have been evaluated, a pre-determined period of time has elapsed, and a pre-determined period of time has elapsed since a change of the value meeting the predetermined objective.

Determining the deviation from the current configuration may be based on a weighted number of changes to the current configuration, wherein weighting is based on at least one of shift time, shift location and shift co-workers.

The second evaluation module may cease determining the deviation from the current configurations if at least one of a one of a pre-determined number of asset configurations have been evaluated, a pre-determined period of time has elapsed, and a pre-determined period of time has elapsed since a change of the lowest deviation.

The second evaluation module may output an asset configuration solution with the lowest deviation and the value meeting the predetermined objective.

Features of the service delivery environment may include at least one of how work arrives to the service delivery environment, how the work is prioritized, how the work is assigned to and serviced by different agents, and how the work exits the service delivery environment.

The plurality of constraints may include at least one of service level targets, limits for control of backlog, and contractual constraints on resource availability.

The value may be cost and the predetermined objective may be lowest cost of each of the asset configurations. The value may be profit and the predetermined objective may be highest profit of each of the asset configurations.

According to an exemplary embodiment of the present invention, a method for determining asset configuration in a service delivery environment comprises collecting constraint data comprising a plurality of constraints for the service delivery environment, developing a simulation model reflecting features of the service delivery environment, using the simulation model and the constraint data to determine a plurality of asset configurations for evaluation, determining a value of each of the asset configurations, and determining the asset configuration of the plurality of asset configurations that yields a value meeting a predetermined objective, determining a deviation from a current configuration that would be caused by each of the asset configurations, and determining, while using the value meeting the predetermined objective as a constraint, the asset configuration that yields a lowest deviation of the plurality of asset configurations, wherein one or more steps of the method are performed by a computer system comprising a memory and at least one processor coupled to the memory.

The method may further comprise collecting information on the current configurations including at least one of current asset assignments and skills mix.

At least one of scatter search and tabu search may be used to determine the plurality of asset configurations.

The method may further comprise determining whether the plurality of asset configurations meet the plurality of constraints.

The value of each of the asset configurations may be based on a number of agents in a configuration and use weighted amounts based on at least one of experience level and efficiency of the agents.

The method may further comprise identifying a target utilization of each agent of a plurality of agents for use when determining the value of each of the asset configurations.

The method may further comprise ceasing determining the value of each of the asset configurations if at least one of a pre-determined number of asset configurations have been evaluated, a pre-determined period of time has elapsed, and a pre-determined period of time has elapsed since a change of the value meeting the predetermined objective.

Determining the deviation from the current configuration may be based on a weighted number of changes to the current configuration, wherein weighting is based on at least one of shift time, shift location and shift co-workers.

The method may further comprise ceasing determining the deviation from the current configurations if at least one of a one of a pre-determined number of asset configurations have been evaluated, a pre-determined period of time has elapsed, and a pre-determined period of time has elapsed since a change of the lowest deviation.

The method may further comprise outputting an asset configuration solution with the lowest deviation and the value meeting the predetermined objective.

According to an exemplary embodiment of the present invention, an article of manufacture comprising a computer readable storage medium comprises program code tangibly embodied thereon, which when executed by a computer, performs method steps for determining asset configuration in a service delivery environment, the method steps comprising collecting constraint data comprising a plurality of constraints for the service delivery environment, using the constraint data to determine a plurality of asset configurations for evaluation, determining a value of each of the asset configurations, and determining the asset configuration of the plurality of asset configurations that yields a value meeting a predetermined objective, determining a deviation from a current configuration that would be caused by each of the asset configurations, and determining, while using the value meeting the predetermined objective as a constraint, the asset configuration that yields a lowest deviation of the plurality of asset configurations.

According to an exemplary embodiment of the present invention, an apparatus for determining asset configuration in a service delivery environment, comprises a memory, and a processor coupled to the memory and configured to execute code stored in the memory for collecting constraint data comprising a plurality of constraints for the service delivery environment, using the constraint data to determine a plurality of asset configurations for evaluation, determining a value of each of the asset configurations, and determining the asset configuration of the plurality of asset configurations that yields a value meeting a predetermined objective, determining a deviation from a current configuration that would be caused by each of the asset configurations, and determining, while using the value meeting the predetermined objective as a constraint, the asset configuration that yields a lowest deviation of the plurality of asset configurations.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which.

DETAILED DESCRIPTION OF EXEMPLARY EMBODIMENTS

Exemplary embodiments of the invention will now be discussed in further detail with regard to systems and methods for determining optimal asset configurations and, in particular, to systems and methods for determining optimal asset configurations while minimizing disruption to existing business operations in a service delivery environment. This invention may, however, be embodied in many different forms and should not be construed as limited to the embodiments set forth herein.

Asset configurations as used herein can refer to any asset or set of assets, and configurations thereof, that are used to contribute to delivering a service and/or responding to one or more service requests. Assets may have one or more attributes that are used to meet the needs of a customer requiring a service and/or response to a service request. For example, assets may include computer applications and application attributes, e.g., a payroll function; equipment and attributes of equipment capability related to the service; a knowledge-base with particular attributes (e.g., search index); and/or a staffing configuration, which is a configuration of service agents for delivering one or more of such services and/or responding to one or more service requests.

A configuration of assets can include one or more assets of different types with different attributes used to deliver the requested services and/or responses.

While there may be multiple asset configurations in a service delivery environment that will achieve the same objective, such as, for example, minimal system cost or maximum profit, embodiments of the present invention relate to systems and methods for selecting the configuration that also minimizes unnecessary disruption to business operations. Unnecessary disruption to business operations includes, for example, unnecessary changes in asset configuration.

In accordance with embodiments of the present invention, methods and systems for including a measure of the impact of disruption to business operation take into consideration that disruption is typically measured using a distance measure, while system cost, profits and/or meeting service level agreement (SLA) requirements can be measured using dollar cost. For example, SLA requirements met can result in increased revenue, while SLA violations may incur monetary violations. In addition, asset configuration costs and profits can be measured with monetary values. However, disruption to business is a distance based metric. Accordingly, the embodiments of the present invention provide a mechanism for combining the distance and cost based metrics into a single optimized objective.

According to an embodiment of the present invention, disruption to business can be measured as a count of the number of changes to a current asset configuration. For example, if one agent worked in the evening and now is moved to the morning shift, the disruption=1.

According to an embodiment, the measure can also be weighted. For example, if the night shift is considered less desirable to the agents, then a penalty p can be applied for each agent who is moved to the night shift, where the count of the number of changes to a current asset configuration is multiplied by the penalty p. For example, if three agents worked in the morning and are now moved to the night shift, the disruption=3p.

In accordance with embodiments, other considerations for weighting disruption may include physical relocation, with whom the agent works (co-workers on agents shift), and the like.

According to an embodiment, an optimization problem is defined where the purpose is to meet a particular objective, with no consideration of disruption to business operations. The objective can be, for example, to minimize cost, maximize profit, and/or perform specified tasks or meet certain goals pursuant to an SLA. Then, an optimization problem is defined where the purpose is to minimize modifications from the day-to-day business operations, for example, the weighted deviations discussed above, and a constraint is that a resulting value of the asset configuration must equal the value identified under the previous optimization that meets the specified objective. As a result, the impact of disruption to business operations is considered in the final asset configuration solution. In other words, the solution that meets the specified objective (e.g., the minimum cost solution or maximum profit solution) also provides the least disruption to day to day operations.

Figure 1:
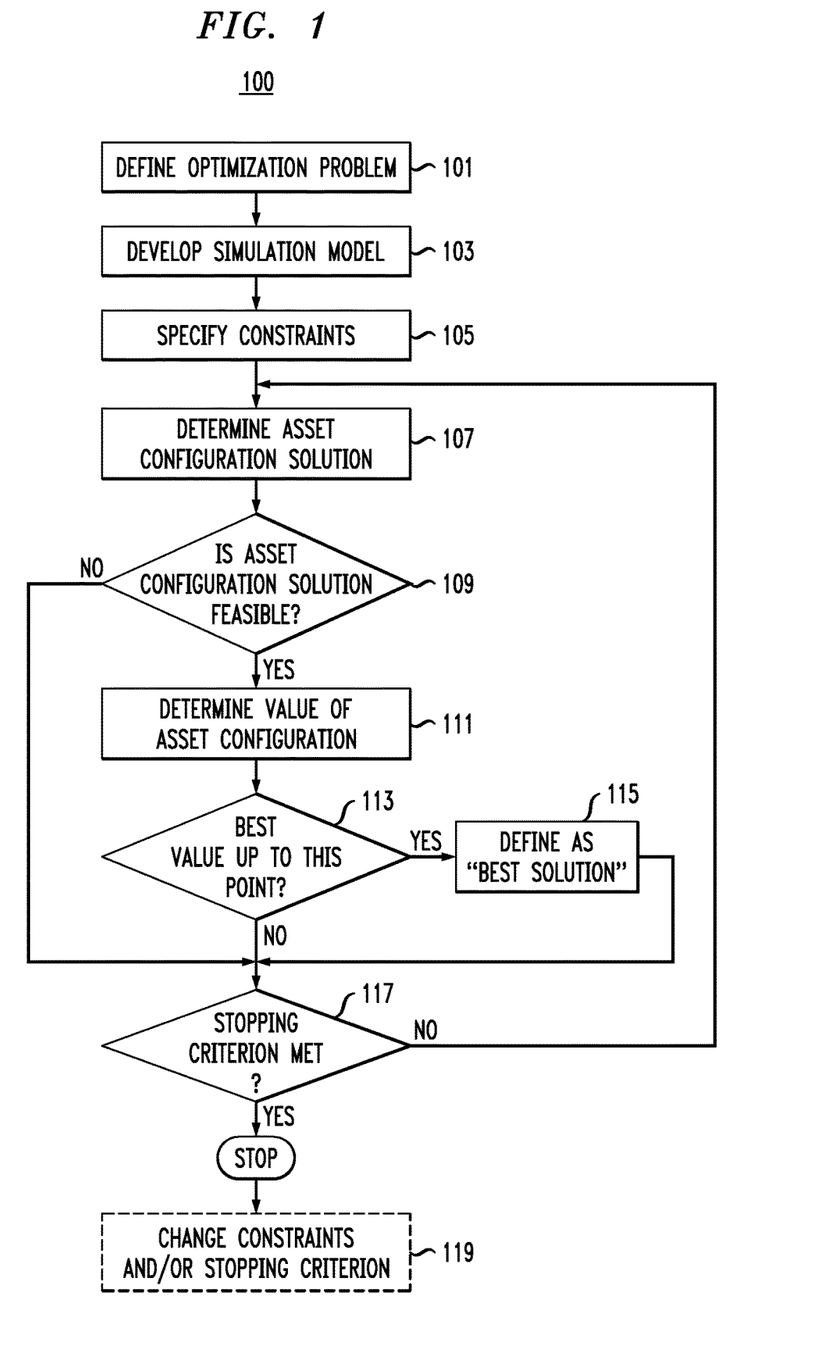
FIG. 1 is a flow diagram of a part of a method for determining optimal asset configurations while minimizing disruption to existing business operations in a service delivery environment according to an exemplary embodiment of the invention.

Referring to FIG. 1, which is a flow diagram of a part of a method for determining optimal asset configurations while minimizing disruption to existing business operations in a service delivery environment, according to an embodiment of the present invention, block 101 includes a formulation step, wherein an optimization problem is defined, wherein the purpose is to meet a particular objective, such as minimizing asset configuration cost or maximizing profit. There may be a variety of constraints for this problem, including but not limited to defined service level targets, limits for control of backlog, and customer contractual constraints on resource availability, such as, for example, constraints on the number of agents per shift, dedicated resources that must be allocated to a particular account, and/or required agent skills mix, which can be specified in the SLA.

Then, at block 103, a simulation model that accurately reflects all system operations is developed. According to an embodiment, the simulation model includes, but is not limited to, such features as how work arrives to the system, is prioritized, is assigned to and serviced by the different agents, and how the work exits the system. The simulation model may also include details on how performance by the agents is measured.

At block 105, the constraints that define feasible search space, for example, the constraints referenced above, are specified. At block 107, an asset configuration solution, for example, the number of agents per shift and/or skills mix, is determined. According to an embodiment, techniques such as scatter search and tabu search, which, for example, combine previous feasible solutions, or other metaheuristic, combination or path relinking mechanisms are used to determine the asset configuration. At block 109, the asset configuration solution is evaluated via simulation for feasibility. For example, some agents may have the necessary skills to perform work that comes into the system, while other agents do not have these skills. In addition, agents with similar skill sets may have different levels of experience or depths of skills. Therefore, given a particular set of constraints, an asset configuration solution is evaluated to determine whether the configuration, for example, a particular group of agents, is feasible, i.e., the configuration is able to meet the specified constraints. If at block 109, the solution is not feasible, the method proceeds to block 117 to determine if a stopping criterion (described further below) has been met. If a stopping criterion has not been met, another asset configuration solution is determined at block 107. If a stopping criterion has been met, the method is stopped. In the event that a stopping criterion has been met prior to finding a feasible solution, the method can proceed to block 119 where some of the constraints can be relaxed or removed and/or the stopping criterion modified so that the system is not overly constrained and a feasible solution can be found. Once the constraints and/or stopping criterion are changed, the method can then proceed to block 107 to again attempt to find a feasible solution.

While a feasible solution is any solution that meets the specified constraints, the purpose is to find a feasible solution that meets the specified objective. If at block 109, the solution is deemed feasible, a monetary value of the configuration is determined at block 111. According to an embodiment, agents can be weighted according to their level of experience, where the cost of an agent can track the agent's salary, so that lower level agents incur less cost. The value calculation is based on the number of agents in a configuration needed to perform a task, and the weighted amounts, with objective being to find a weighted value that meets the objective, for example, the minimum weighted cost or the maximum weighted profit. Weights may also be assigned based on efficiency, where, for example, using an agent with more experience might still be cheaper than using an agent with less experience if the more experienced agent can perform the task in a more efficient manner.

At block 113, a query is performed to determine if the value of the instant configuration is the best up to this point (e.g., the lowest cost, highest profit, etc.). If yes, then the instant configuration is defined as the "best solution" at block 115, i.e., the configuration identified up to this point that best meets the objective, and the process proceeds to block 117 where it is determined if a stopping criterion has been met. If no at block 113, the process proceeds to block 117. According to embodiments of the present invention, stopping criteria includes, but is not limited to, that (i) a pre-specified number of asset configurations have been evaluated, (ii) a pre-specified period of evaluation time has elapsed, or (iii) a pre-specified period of time has elapsed since the last change in optimal identified asset configuration (e.g., a pre-determined time period of time has elapsed since a new "best solution" has been determined). If a stopping criterion has been met at block 117, then the process stops. If a stopping criterion has not been met at block 117, then the process returns to step 107 to determine a next asset configuration solution to be evaluated to see if the next asset configuration solution is the "best solution".

Figure 2:
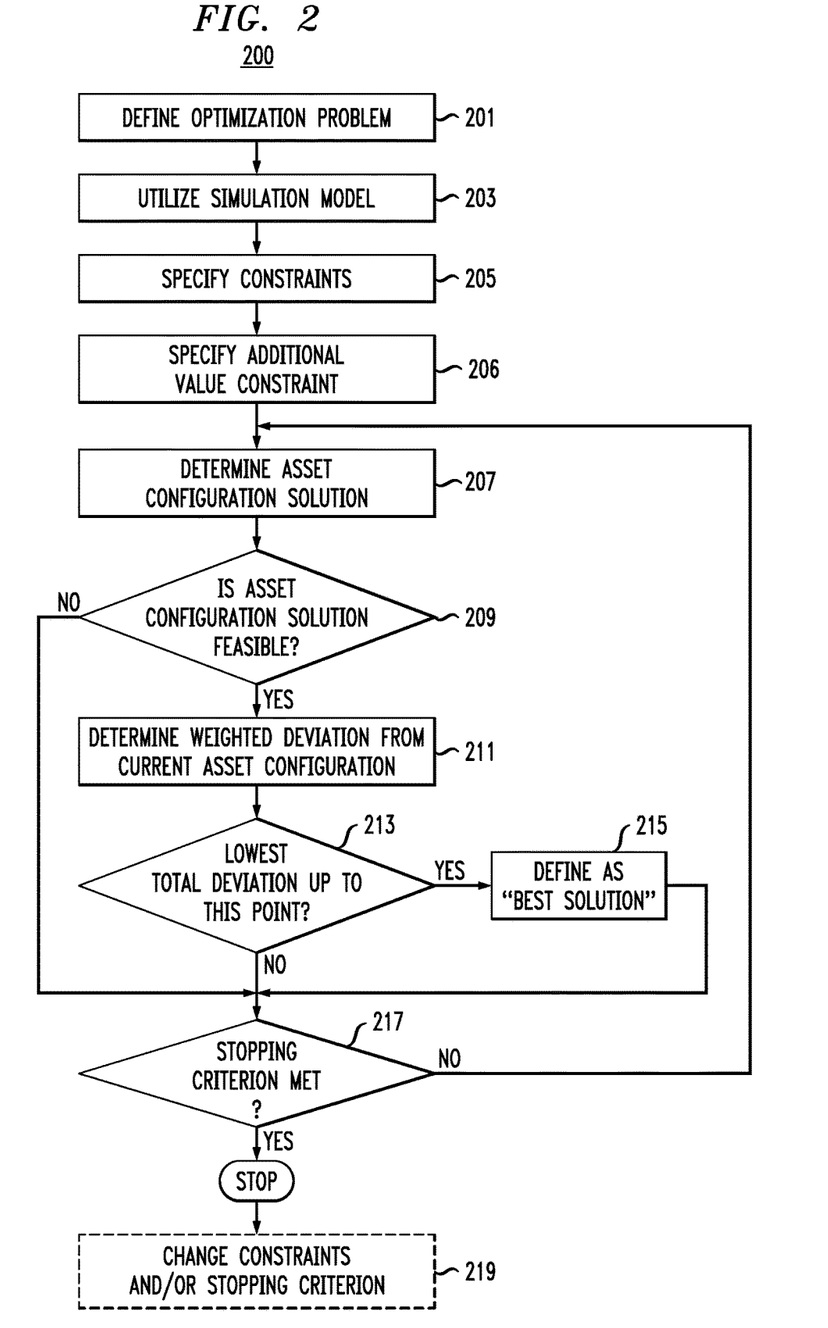
FIG. 2 is a flow diagram of a part of a method for determining optimal asset configurations while minimizing disruption to existing business operations in a service delivery environment according to an exemplary embodiment of the invention.

Referring to FIG. 2, which is a flow diagram of another part of a method for determining optimal asset configurations while minimizing disruption to existing business operations in a service delivery environment, according to an embodiment of the present invention, block 201 includes a formulation step, wherein an optimization problem is defined, wherein the purpose is to minimize weighted deviations from the current asset configurations. As with the method described in connection with FIG. 1, there may be a variety of constraints for this problem, including but not limited to defined service level targets, limits for control of backlog, and customer contractual constraints on resource availability, such as, for example, constraints on the number of agents per shift, dedicated resources that must be allocated to a particular account, and/or required agent skills mix, which can be specified in the SLA. There is also the additional constraint that the value of the suggested asset configuration equal the best value as defined by the process of FIG. 1.

At block 203, the simulation model from block 103 in FIG. 1 is utilized. At block 205, the constraints that define feasible search space, for example, the same constraints as in block 105, are specified. At block 206, the additional constraint that the value of the system equal the best value identified in the process of FIG. 1 is specified. At block 207, an asset configuration solution, for example, the number of agents per shift and/or skills mix, is determined. Like the embodiment described in connection with FIG. 1, techniques such as scatter search and tabu search, or other metaheuristic, combination or path relinking mechanisms are used to determine the asset configuration. At block 209, the asset configuration solution is evaluated via simulation for feasibility as in block 109. If at block 209, the solution is not feasible, the method proceeds to block 217 to determine if a stopping criterion has been met. If a stopping criterion has not been met, another asset configuration solution is determined at block 207. If a stopping criterion has been met, the method proceeds similarly to FIG. 1, wherein in the event that a stopping criterion has been met prior to finding a feasible solution, the method can proceed to block 219 where some of the constraints can be relaxed or removed and/or the stopping criterion modified so that the system is not overly constrained and a feasible solution can be found.

If at block 209, the solution is deemed feasible, a weighted deviation from a current asset configuration is determined at block 211. According to an embodiment, a weighted deviation from the current asset configuration can be defined as the weighted difference from a current asset configuration in skills per shift in any shift. As stated above, according to an embodiment of the present invention, disruption to business can be measured as a count of the number of changes to a current asset configuration, and the measure can be weighted. For example, as stated above, if the night shift is considered less desirable to the agents, then a penalty p can be applied for each agent who is moved to the night shift. In addition, as referenced above, other considerations for weighting disruption may include physical relocation, with whom the agent works (co-workers on agents shift), and the like.

At block 213, a query is performed to determine if the weighted deviation of the instant configuration is the lowest total deviation up to this point. If yes, then the instant configuration is defined as the "best solution", i.e., the configuration identified up to this point that yields the least total deviation at block 215, and the process proceeds to block 217 where it is determined if a stopping criterion has been met. If no at block 213, the process proceeds to block 217. According to embodiments of the present invention, stopping criteria includes, but is not limited to, that (i) a pre-specified number of asset configurations have been evaluated, (ii) a pre-specified period of evaluation time has elapsed, or (iii) a pre-specified period of time has elapsed since the last change in optimal identified asset configuration (e.g., a pre-determined time period of time has elapsed since a new "best solution" has been determined). If a stopping criterion has been met at block 217, then the process stops. If a stopping criterion has not been met at block 217, then the process returns to step 207 to determine a next asset configuration solution to be evaluated to see if the next asset configuration solution is the "best solution".

Figure 3:
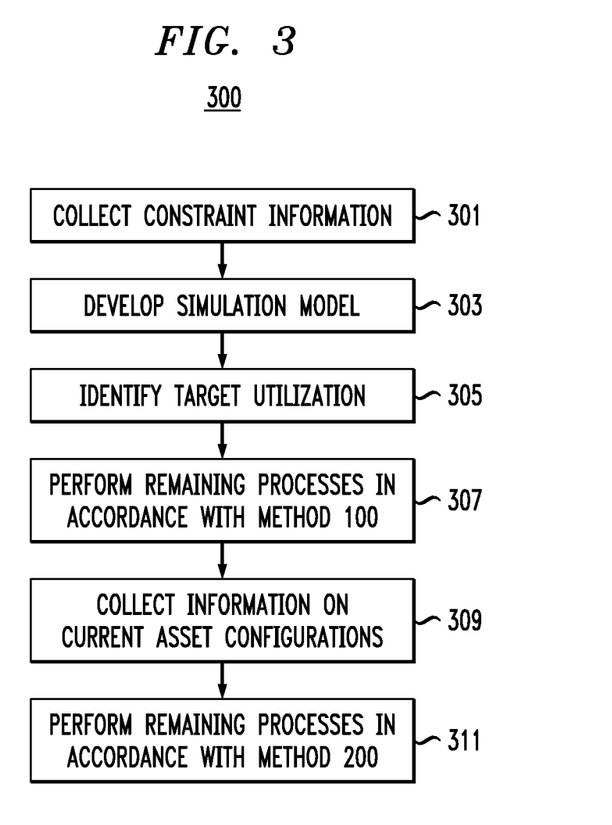
FIG. 3 is a flow diagram of a method for determining optimal asset configurations while minimizing disruption to existing business operations in a service delivery environment according to an exemplary embodiment of the invention.

Referring to FIG. 3, which is a flow diagram of a method for determining optimal asset configurations while minimizing disruption to existing business operations in a service delivery environment, according to an embodiment of the present invention, at block 301 the constraint information from the SLA(s) is collected for a workload arriving to the pool of agents. At block 303, the simulation model is developed in accordance with block 103 of FIG. 1, and at block 305 a target utilization of agents in the pool is identified. The target utilization refers to how much agents are permitted to work, for example, 100%, 80% or 150% of the time. In a situation where agents are, for example, permitted to work 150% of the time, agents can therefore work overtime, requiring a smaller number of agents to meet the constraints. Identifying the target utilization permits an evaluation of the minimum number of agents that can be used to meet the constraints, leading to lower cost.

At block 307, the remaining processes in accordance with blocks 105, 107, 109, 111, 113 and 115 are performed to identify the configuration that yields the value to meet the predetermined objective. At block 309, information on the current asset configurations is collected, including but not limited to, current asset assignments and skills mix. At block 311, the processes in accordance with blocks 201, 203, 205, 206, 207, 209, 211, 213 and 215 are performed to yield the solution with the least weighted deviation from current business operations, while ensuring that the value of the adjusted solution is equal to the value from block 307.

Figure 4:
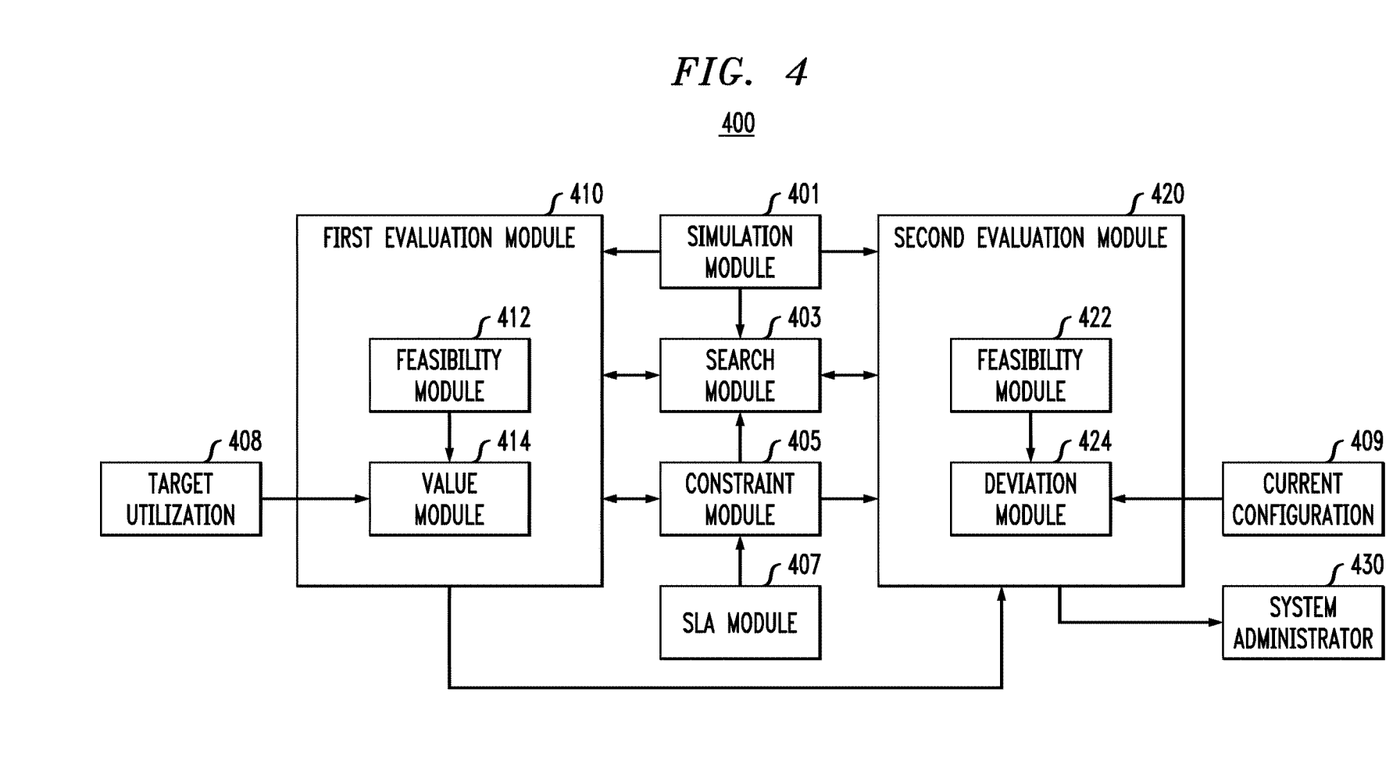
FIG. 4 is a high-level diagram of a system for determining optimal asset configurations while minimizing disruption to existing business operations in a service delivery environment according to an exemplary embodiment of the invention.

Referring to FIG. 4, which is a high-level diagram of a system for determining optimal asset configurations while minimizing disruption to existing business operations in a service delivery environment according to an exemplary embodiment of the invention, the system 400 comprises a simulation module 401, a search module 403, a constraint module 405, and first and second evaluation modules 410 and 420. The simulation module 401 develops a simulation model that accurately reflects all service delivery system operations including, but not limited to, such features as how work arrives to the system, is prioritized, is assigned to and serviced by the different agents, and how the work exits the system. The simulation model may also include details on how performance by the agents is measured. According to an embodiment, the simulation module 401 outputs simulation model data to the search module 403 and the first and second evaluation modules 410 and 420.

The constraint module 405 receives as one or more inputs the variety of constraints as mentioned above, including but not limited to, defined service level targets, limits for control of backlog, and customer contractual constraints on resource availability, such as, for example, constraints on the number of agents per shift, dedicated resources that must be allocated to a particular account, and/or required agent skills mix, which can be specified in an SLA and input to the constraint module 405 from an SLA module 407. The constraint module 405 also receives as an additional constraint, the best value output from the first evaluation module 410, which is used by the second evaluation module 420 as a constraint when determining the asset configuration solution that minimizes the weighted deviations from the current business operations.

According to an embodiment, the constraint module 405 outputs the constraints to the search module 403 and to the first and second evaluation modules 410 and 420. The search module 403 uses the constraint data and the simulation data to determine the asset configurations for evaluation using the techniques described above, such as scatter search and tabu search, or other metaheuristic, combination or path relinking mechanisms. The first and second evaluation modules 410 and 420 use the constraints to evaluate feasibility of the solutions. More specifically, a feasibility module 412 and 422 in respective first and second evaluation modules 410 and 412 uses the constraint data to determine whether the configuration being evaluated is able to meet the specified constraints.

In the first evaluation module 410, if the configuration is not feasible, this information is sent to the search module 403 so that the search module 403 can determine another possible asset configuration. If the configuration is feasible, the value module 414 determines the value of the configuration. As stated above, the value calculation is based on the number of agents in a configuration needed to perform a task, and the weighted amounts. In addition, target utilization data as discussed above, which also factors into the value calculation, is input to the value module 414 from a target utilization module 408. The first evaluation module 410 also determines whether a resulting value is the best value up to that point, defining the value as the "best solution", and further determines whether the process should stop or return to the search module 403 to determine a next asset configuration solution to be evaluated. Once it is determined that the process should stop, the first evaluation module 410 outputs the best value to the constraint module 405 and the second evaluation module 420. Alternatively, the best value from the first evaluation module 410 can be output to the constraint module 405, which will in turn output the best value to the second evaluation module 420.

In the second evaluation module 420, if the configuration is not feasible, this information is sent to the search module 403 so that the search module 403 can determine another possible asset configuration. If the configuration is feasible, the deviation module 424 determines the weighted deviation from the current business operations that would be caused by the proposed asset configuration. As stated above, according to an embodiment, the deviation is the weighted number of changes to a current asset configuration. In order to make this calculation, information on the current asset configurations as discussed above, is input to the deviation module 424 from a current configuration module 409. The second evaluation module 420 also determines whether a resulting deviation is the lowest deviation up to that point, defining the deviation as the "best solution", and further determines whether the process should stop or return to the search module 403 to determine a next asset configuration solution to be evaluated. Once it is determined that the process should stop, the second evaluation module 420 outputs the solution with the least weighted deviation from current business operations, while ensuring that the value of the solution equals the value meeting the predetermined objective from the first evaluation module 410. The solution can be output to a system administrator 430.

If an asset is a machine or software solution, for example, according to an embodiment, the best machine configuration, applications or software solution that meet the business needs can be the best solution at block 115, and best solution at block 215 can be the solution which minimizes change from software and/or equipment solutions that are currently in place.

As will be appreciated by one skilled in the art, aspects of the present invention may be embodied as a system, apparatus, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIGS. 1, 2, 3 and 4 illustrate the architecture, functionality, and operation of possible implementations of systems, methods, and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Figure 5:
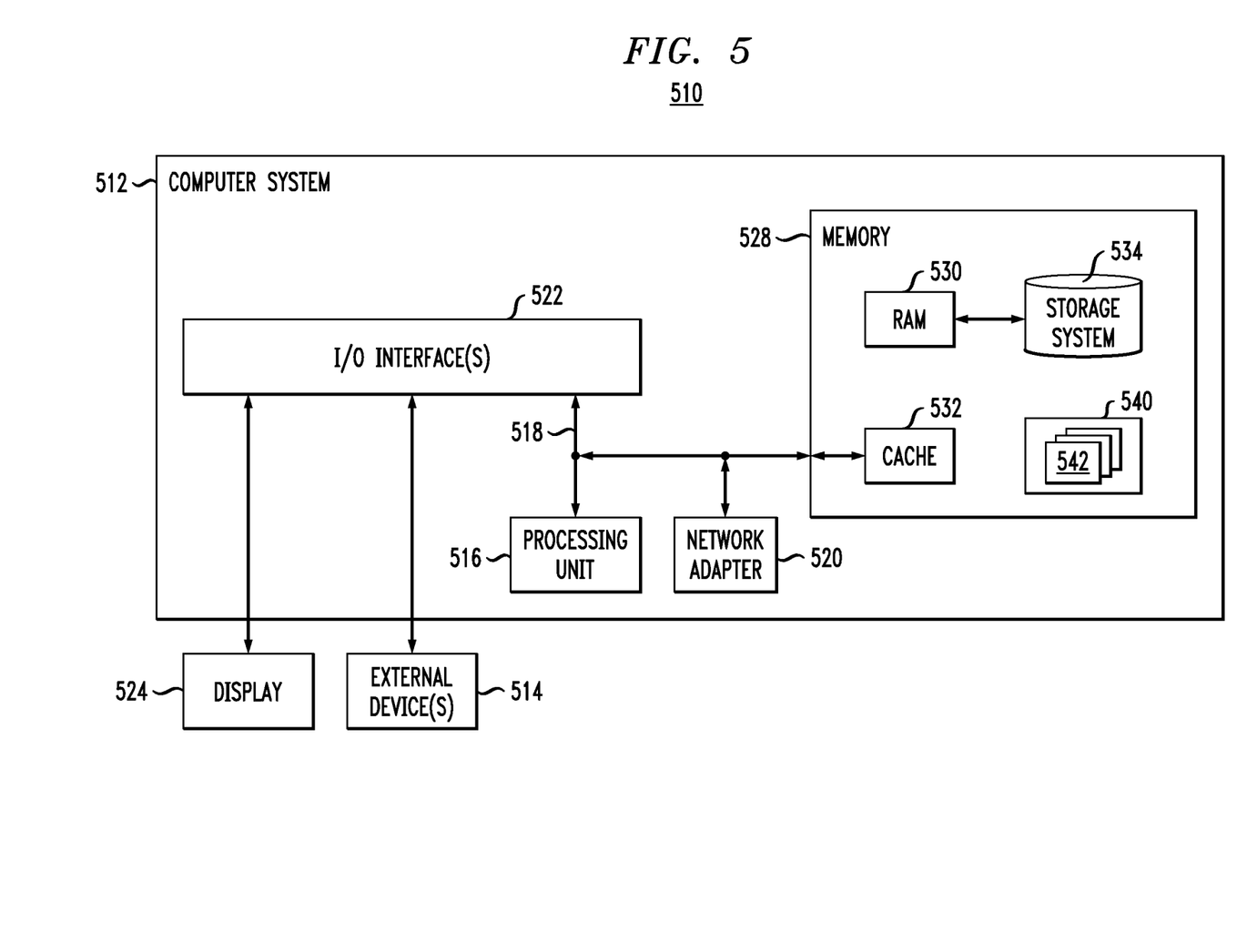
FIG. 5 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 5, in a computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

The bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 512 typically includes a variety of computer system readable media. Such media may be any available media that is accessible by computer system/server 512, and it includes both volatile and non-volatile media, removable and non-removable media.

The system memory 528 can include computer system readable media in the form of volatile memory, such as random access memory (RAM) 530 and/or cache memory 532. The computer system/server 512 may further include other removable/non-removable, volatile/nonvolatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 518 by one or more data media interfaces. As depicted and described herein, the memory 528 may include at least one program product having a set (e.g., at least one) of program modules that are configured to carry out the functions of embodiments of the invention. A program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc., one or more devices that enable a user to interact with computer system/server 512, and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A method for determining asset configuration in a computer-based service delivery environment, the method comprising:
    collecting constraint data comprising a plurality of constraints for the service delivery environment, wherein the plurality of constraints include a service level target, a limit for control of backlog, and a contractual constraint on resource availability;
    developing a simulation model reflecting features of the service delivery environment;
    collecting simulation model data;
    using the simulation model and the constraint data to determine a plurality of asset configurations for evaluation, wherein the plurality of asset configurations each comprise a configuration of a plurality of agents, and at least one of a machine configuration and a computer software configuration, and wherein the determining of the plurality of the asset configurations is performed by using at least one metaheuristic mechanism;
    evaluating, via a simulation, whether an asset configuration of the plurality of asset configurations is able to meet the plurality of constraints;
    determining a value of each of the asset configurations, and determining the asset configuration of the plurality of asset configurations that yields a value meeting a predetermined objective;
    determining a deviation from a current configuration that would be caused by each of the asset configurations, and determining, while using the value meeting the predetermined objective as a constraint, the asset configuration that yields a lowest deviation of the plurality of asset configurations; and
    identifying a target utilization of each agent of the plurality of agents for use when determining the value of each of the asset configurations, wherein the target utilization comprises a percentage of time each agent of the plurality of agents is permitted to work;
    wherein determining the deviation from the current configuration is based on a weighted number of changes to the current configuration, and the weighted number of the changes is calculated by multiplying a count of the changes to the current configuration by one or more penalties;
    wherein the one or more penalties correspond to one or more of the changes determined to result in at least one of a shift change of an agent of the plurality of agents, a relocation of an agent of the plurality of agents, and an altering of which of one or more agents of the plurality of agents interact with an agent of the plurality of agents;
    wherein the value of each of the asset configurations is a monetary-based metric, and the deviation from the current configuration is a distance-based metric including a measure of one or more modifications to at least one of a current machine configuration and a current computer software configuration;
    wherein the lowest deviation is a solution that minimizes the one or more modifications to at least one of the current machine configuration and the current computer software configuration while meeting the predetermined objective;
    wherein the method further comprises:
        determining whether a stopping criterion has been met;
        limiting or removing one or more of the plurality of constraints if an asset configuration meeting the plurality of constraints is not found before the stopping criterion has been met; and
        continuing with determining the value of each of the asset configurations after the limiting or removal of one or more of the plurality of constraints; and
    wherein one or more steps of the method are performed by a computer system comprising a memory and at least one processor coupled to the memory.

2. The method of claim 1, further comprising collecting information on the current configurations including at least one of current asset assignments and capabilities mix.

3. The method of claim 1, wherein at least one of scatter search and tabu search are used to determine the plurality of asset configurations.

4. The method of claim 1, wherein determining of the value of each of the asset configurations is based on a number of assets in a configuration and uses weighted amounts based on at least one of capabilities and efficiency of the assets.

5. The method of claim 1, further comprising ceasing determining the value of each of the asset configurations if the stopping criterion has been met, wherein the stopping criterion is selected from the group consisting of a pre-determined number of asset configurations having been evaluated, a pre-determined period of time has elapsed, and a pre-determined period of time has elapsed since a change of the value meeting the predetermined objective.

6. The method of claim 1, further comprising ceasing determining the deviation from the current configuration if the stopping criterion has been met, wherein the stopping criterion is selected from the group consisting of a one of a pre-determined number of asset configurations having been evaluated, a pre-determined period of time has elapsed, and a pre-determined period of time has elapsed since a change of the lowest deviation.

7. The method of claim 1, further comprising outputting an asset configuration solution with the lowest deviation and the value meeting the predetermined objective.

8. The method of claim 1, wherein the features of the service delivery environment reflected in the simulation model include at least one of how work arrives to the service delivery environment, how the work is prioritized, how the work is assigned to and serviced by different assets, and how the work exits the service delivery environment.

9. The method of claim 1, wherein the value meeting the predetermined objective is a cost and the predetermined objective is lowest cost of each of the asset configurations.

10. The method of claim 1, wherein the value meeting the predetermined objective is a profit and the predetermined objective is highest profit of each of the asset configurations.

* * * * *